(12) United States Patent
Panje (10) Patent No.: US 11,962,823 B2
(45) Date of Patent: Apr. 16, 2024

(54) SYSTEM AND METHOD FOR ADAPTIVE STREAMING MANAGEMENT

(71) Applicant: ARRIS ENTERPRISES LLC, Suwanee, GA (US)

(72) Inventor: Krishna Prasad Panje, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 15 days.

(21) Appl. No.: 17/519,030

(22) Filed: Nov. 4, 2021

(65) Prior Publication Data
US 2022/0201344 A1 Jun. 23, 2022

Related U.S. Application Data

(60) Provisional application No. 63/129,840, filed on Dec. 23, 2020.

(51) Int. Cl.
*H04N 21/238* (2011.01)
*H04N 21/24* (2011.01)
*H04N 21/262* (2011.01)

(52) U.S. Cl.
CPC ....... *H04N 21/238* (2013.01); *H04N 21/2402* (2013.01); *H04N 21/26258* (2013.01)

(58) Field of Classification Search
CPC ............. H04N 21/238; H04N 21/2402; H04N 21/26258
See application file for complete search history.

(56) References Cited

U.S. PATENT DOCUMENTS

| 11,115,697 | B1* | 9/2021 | Nandakumar ... H04N 21/25825 |
| 2008/0267213 | A1 | 10/2008 | Deshpande |
| 2012/0297430 | A1 | 11/2012 | Morgos et al. |
| 2013/0007831 | A1* | 1/2013 | Wu ..................... H04N 21/2385 725/116 |
| 2017/0019453 | A1 | 1/2017 | Panje |
| 2017/0171103 | A1* | 6/2017 | Gouache ......... H04N 21/23439 |
| 2018/0309694 | A1 | 10/2018 | Gouache et al. |
| 2019/0020910 | A1 | 1/2019 | Panje et al. |
| 2019/0141375 | A1* | 5/2019 | Wallters ............. H04N 21/2385 |

OTHER PUBLICATIONS

International Search Report and Written Opinion for Application No. PCT/US2021/058046 dated Jan. 28, 2022.

\* cited by examiner

*Primary Examiner* — Mulugeta Mengesha
*Assistant Examiner* — Alexander Boyd
(74) *Attorney, Agent, or Firm* — Panitch Schwarze Belisario & Nadel LLC (57) ABSTRACT

A system and method for enabling adaptive streaming management in a broadband multimedia environment. The system utilizes content information (title, streaming resolution, etc.), in conjunction with information indicative of one or more of display device resolution capabilities, device display resolution capabilities, total streaming bandwidth capability of broadband source, and the aggregate bandwidth of all streams being provided to client devices to provide an adaptive process by which media gateway resources can be utilized to improve the availability to optimized content to one or more users.

24 Claims, 5 Drawing Sheets

SYSTEM AND METHOD FOR ADAPTIVE STREAMING MANAGEMENT

CROSS-REFERENCE TO RELATED APPLICATION

This application claims the benefit of U.S. Provisional Patent Application No. 63/129,840, filed Dec. 23, 2020, which is incorporated by reference herein in its entirety.

BACKGROUND OF THE INVENTION

The ever-increasing provision of broadband media services to residential customers has greatly expanded consumer access to a host of entertainment and information sources. Typically, access to broadband media is managed through a media gateway appliance ("MGA"), such as broadband modem. Typically, an MGA is linked via a local network to one or more client devices, such as set-top boxes, smart televisions; computers, tablets or smartphones. An MGA is most often connected to a headend managed by a multi-service operator ("MSO"). A consumer can utilize the MGA, in conjunction with one or more client devices such as set-top boxes, to access streaming broadband media content originating from the headend (on-demand programming, live network programming, etc.) or stream stored content from local or networked storage.

One of the most common types of content streamed via MGAs is digital video; digital video is also one of the most bandwidth-intensive content types. Digital video is typically streamed at a variety of resolutions, including: standard definition ("SD"), 720p high resolution ("HD 720p"), 1080p high resolution ("HD 1080p") and ultra-high definition ("4K"). As shown below, each of these resolutions requires a different streaming rate to ensure proper viewing:

| Video Resolution | Typical Streaming Rate |
| --- | --- |
| 4K | 25-50 Mbps |
| HD 1080p | 8-12 Mbps |
| HD 720p | 4-6 Mbps |
| SD | 1-2 Mbps |

Am MGA connected to a typical residential broadband connection can support a maximum streaming rate of approximately 100 Mbps. This maximum streaming rate could easily be exceeded if, for example, one or more devices linked to the MGA attempted to stream three 4K video programs, or two 4K and one HD 1080p program. Either of these scenarios is not hard to imagine given that the number of connected devices in a given household continues to rise, putting ever increasing demands on residential broadband connections. When the streaming demand exceeds the available streaming bandwidth, users are likely to experience disruptions in the delivered content, ranging from frozen frames to complete loss of a program stream. The pitfalls of exceeding the maximum streaming rate can be avoided by limiting the number of and or type of streams that can be simultaneously supported by a given MGA. However, this type of strict limitation would likely result in one or more users not be able to access a desired video stream at a desired time.

It would be far more desirable to provide a system and method wherein the rate of streaming to particular linked devices is limited in accordance with the particular resolution(s) supported by each device. For example, streaming 4K program content to a device that is only capable of displaying HD 1080p content would result in the utilization of between 4 and 6 times the bandwidth required to support 1080p content streaming. An MGA capable of determining the resolution(s) supported by a linked device, and then accessing and directing a stream having an appropriate resolution/bitrate to the linked device would be advantageous. Ideally, the MGA would be capable of automatically making such determinations based upon linked device-related information and overall bandwidth availability.

BRIEF SUMMARY OF THE INVENTION

A system and method for enabling adaptive streaming management in a broadband multimedia environment. The system utilizes content information (title, streaming resolution, etc.), in conjunction with information indicative of one or more of display device resolution capabilities, device display resolution capabilities, total streaming bandwidth capability of broadband source, and the aggregate bandwidth of all streams being provided to client devices to provide an adaptive process by which media gateway resources can be utilized to improve the availability to optimized content to one or more users.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
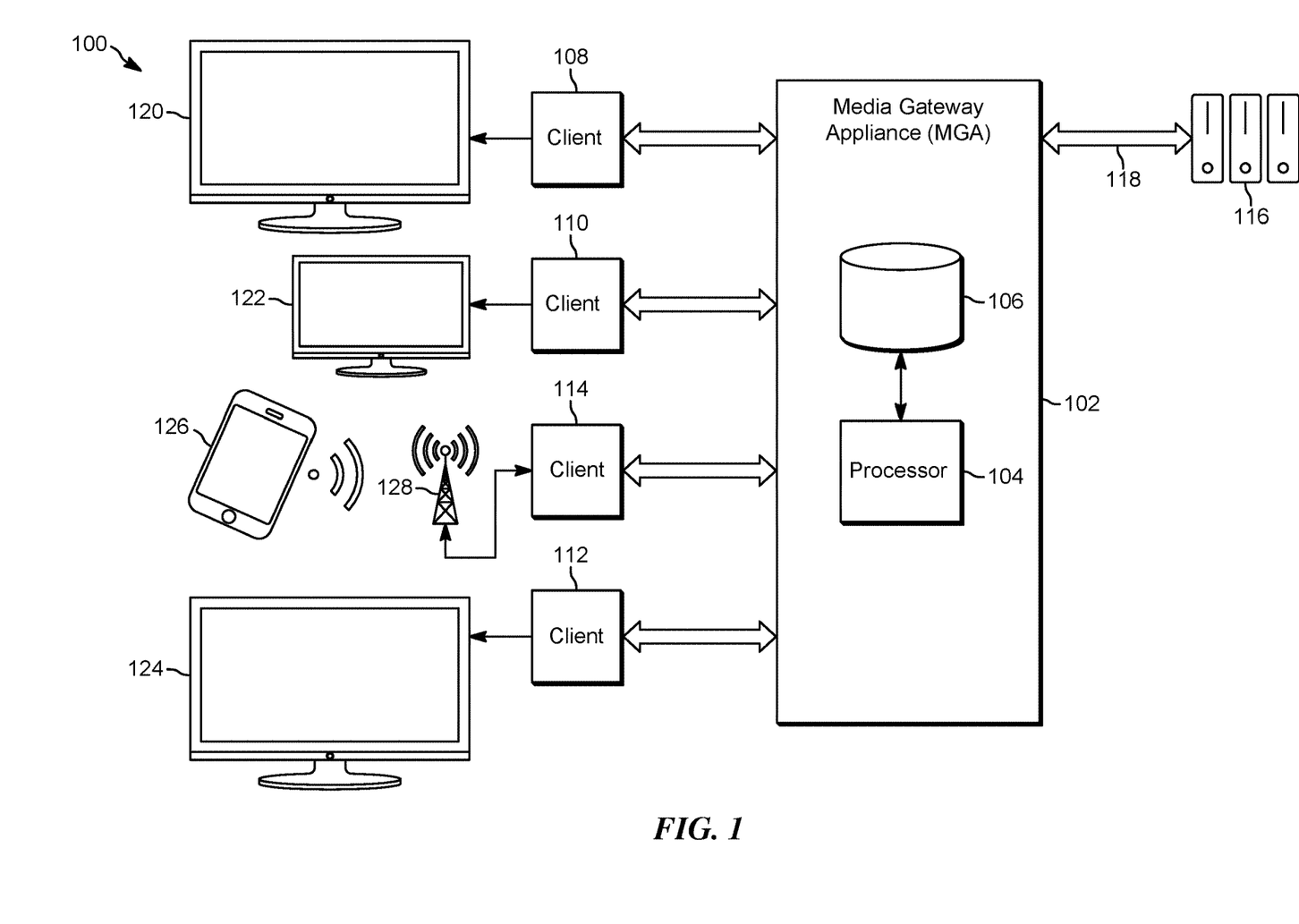
FIG. 1 is a functional block diagram of a first preferred embodiment of a system (100) adapted to provide adaptive streaming management.

FIG. 1 is a functional diagram of a first preferred embodiment of a system (100) adapted to provide the adaptive streaming management utilizing an MGA linked to a broadband source. As shown, the system comprises MGA 102 which includes processor 104 and memory 106. MGA 102 is shown to connected to client devices 108, 110, 112 and 114. MGA 102 is also shown to be linked to MSO headend 116 via broadband network 118. Client devices 108, 110, 112 and 114 are each shown to be linked to a particular display device. Client devices 108, 110 and 112 are each linked a digital television ("DTV"); DTVs 120, 122 and 124, respectively. Client device 114 is linked to tablet 126 via wireless network 128. Wireless network can be any network suited to support bidirectional digital communication, such as networks conforming to IEEE standards 802.11 or 802.15.

Each of the display devices are capable of supporting one or more video resolutions as shown in the Table A, below:

TABLE A

| Display Device | Supported Video Resolution(s) | | | |
| --- | --- | --- | --- | --- |
| | 4K | 1080p | 720p | SD |
| DTV 120 | • | • | • | • |
| DTV 122 | | • | • | • |
| DTV 124 | | • | • | • |
| Tablet 126 | | | • | |

Figure 2:
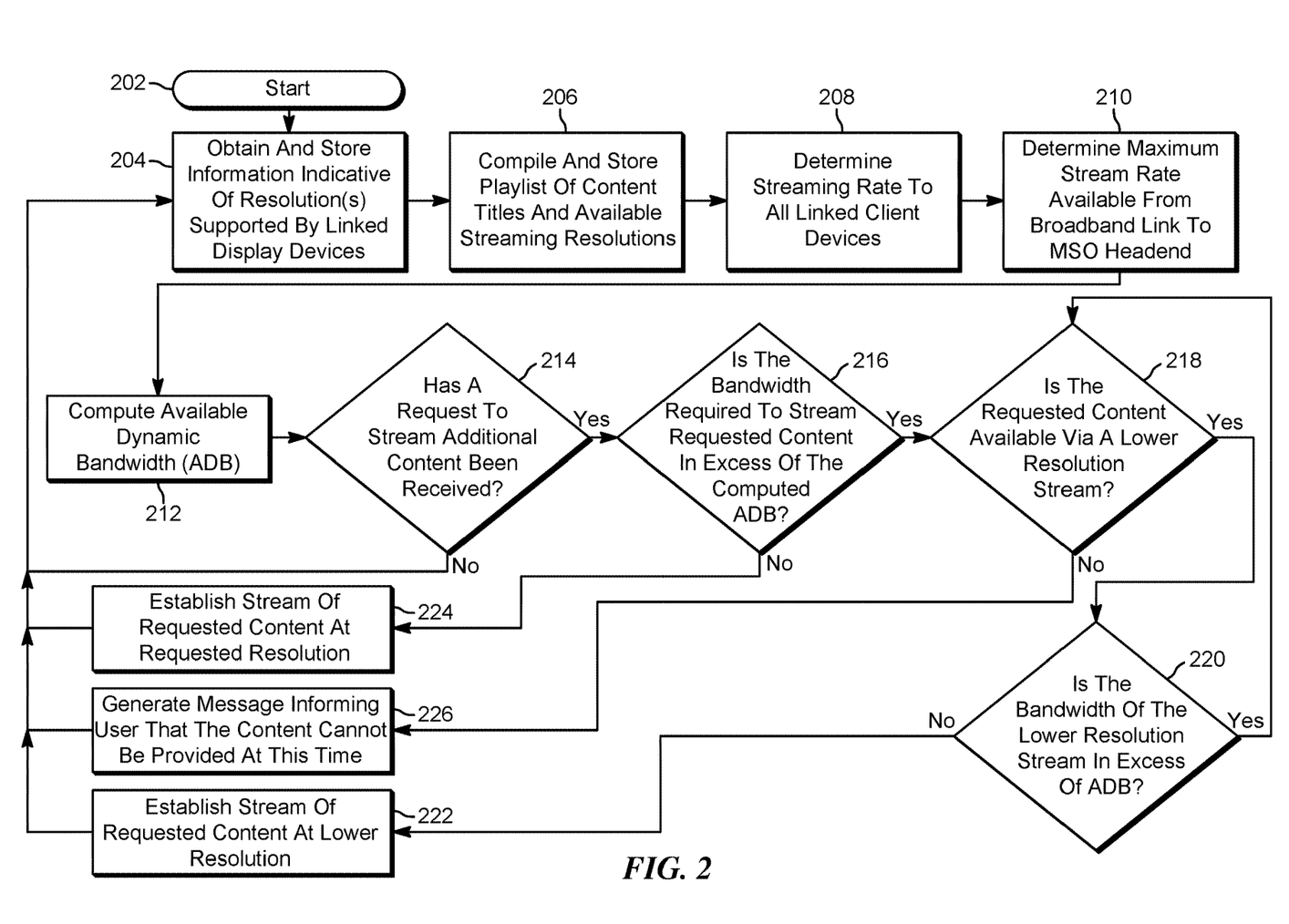
FIG. 2 is a flow diagram of a first process supported by the system of FIG. 1

Processor 104 is adapted to store information indicative of the particular resolution(s) supported by each of the display devices is stored in memory 106 (see steps 202 and 204 of FIG. 2). This information could be entered manually by a user utilizing a graphical interface generated by processor 104 upon one of the DTVs, the tablet, or some other suitable display. The information could also be provided to processor 104 automatically when a given display device is linked to a client device. For example, when DTV 120 was linked to client device 108, an initial GET (typically employing HTTP protocol) from client device 108 would request resolution information. Processor 104 would then store the received information in one or more locations within memory 106, each of associated with DTV 120. Similar processes could be executed for displays devices 122, 124 and 126 via client devices 110, 112 and 114, respectively.

Processor 104 is also adapted to compile a resolution playlist of content available for streaming via MGA 102 (step 206). This playlist indicates the particular resolution or resolutions at which a particular streamed content is available from MSO headend 116. An example of one such playlist is provided in Table B:

TABLE B

| Content Title | Available Video Resolution | | | |
| --- | --- | --- | --- | --- |
| | 4K | 1080p | 720p | SD |
| Epic Movie | • Chan A | | | |
| Soccer Match | • Chan B | • Chan C | • Chan D | |
| Cricket Match | | • Chan E | • Chan F | • Chan G |
| Cooking Program | | • Chan H | • Chan I | • Chan J |

The information required to compile the playlist is obtained from MSO headend 116 via broadband network 118. Processor 104 stores information indicative of the playlist in memory 106.

Processor 104 also monitors the streaming rate being supported by MGA 102 to each of client devices 108-114 (step 208), and the overall streaming bandwidth that can be supported by broadband network 118 (step 210). All these rates are likely to vary as program content being delivered to a particular device varies frame to frame, and as a function of the particular network resources accessible via broadband network 118 at any given time. Processor 104 then computes the available dynamic available dynamic ("ADB") that may be utilized for the streaming of additional content as follows: ADB=overall streaming bandwidth−total bandwidth of all streams to client devices (step 212).

Assume that at a particular time, system 100 is capable of accessing a total bandwidth of 70 Mbps via broadband network 118, client devices 108, 110 and 114 are streaming content as shown below:

TABLE C

| Client/Device | Content | Resolution/Consumed Bandwidth |
| --- | --- | --- |
| 108 | Epic Movie | 4K/35 Mbps |
| 110 | Soccer Match | 4K/30 Mbps |
| 114 | Cooking Program | 720p/5 Mbps |

A total bandwidth of 65 Mbps is being consumed by the three devices in support of streaming video content. With system 100 in the above state, broadband network 118 is only capable of supporting an additional 5 Mbps of bandwidth for delivering content such as streaming video.

Assume a request was received by MGA 102 to stream a cricket match at a resolution of 1080p (requiring up to 12 M bps of bandwidth) to client device 112 for display upon DTV 124 (step 214). Processor 104 then makes a determination if fulfilling such a request would exceed the ADB (step 218). If step 218 resulted in a negative outcome (requested content is not in excess of ADB), the requested stream would be established at the requested resolution (step 224). However, a request to establish an additional stream to support 1080p content would indeed be in excess of ADB (12 Mbps>5 Mbps), and result in an affirmative outcome for step 216.

The process would then continue with step 218 wherein processor 104 references the stored playlist to determine if the requested content (cricket match) is available via a lower resolution stream. As shown in Table B, the cricket match is available as a 720p stream and an SD stream. Consequently, the process continues with step 220. Had the cricket match been unavailable via a lower resolution stream, processor 104 would have generated a message (ideally displayed upon DTV 124), informing the requesting user that the content cannot be provided at this time (step 226).

In step 220, the processor obtains the information indicative of the next lower bandwidth via which the cricket match is available—720p—and determines if establishing such a stream to client device 112 would require bandwidth ion excess of ADB. As a 720p stream can require up to 6 Mbps, the ADB of 5 Mbps is indeed exceeded. And process reverts to step 218.

In step 218 processor 104 again references the stored playlist to determine if the requested content (cricket match) is available via an even lower resolution stream. The cricket match is available via an SD stream, so the process continues with step 220. In step 220, the processor obtains the information indicative of the next lower bandwidth (SD) via which the cricket match is available. An SD stream requires a maximum of 2 Mbps, so the ADB of 5 Mbps is not exceeded. The process continues with step 222 and an SD content stream to client device 114 is established.

Figure 3A:
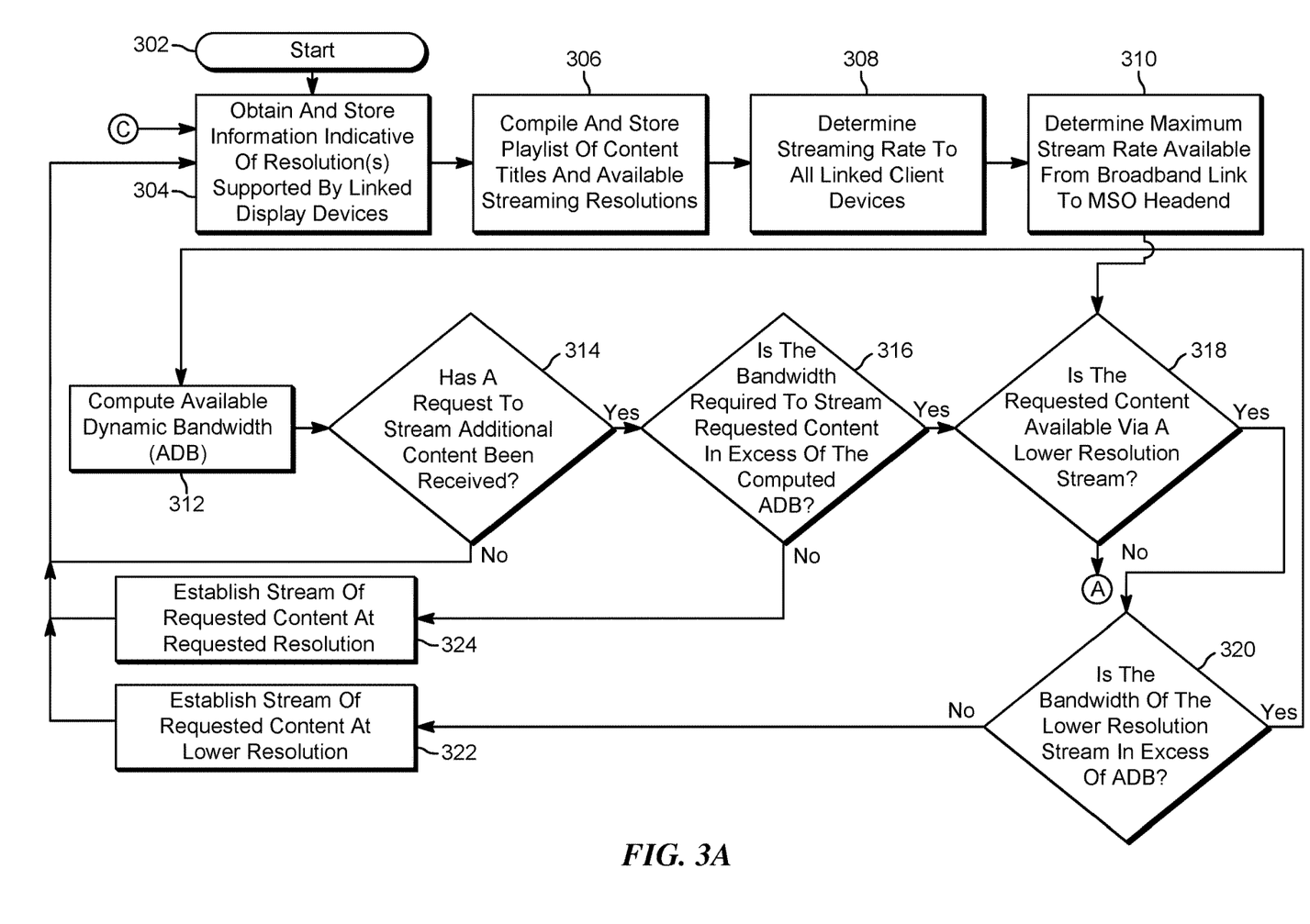
FIGS. 3A and 3B constitute a flow diagram of a second process supported by the system of FIG. 1
Figure 3B:
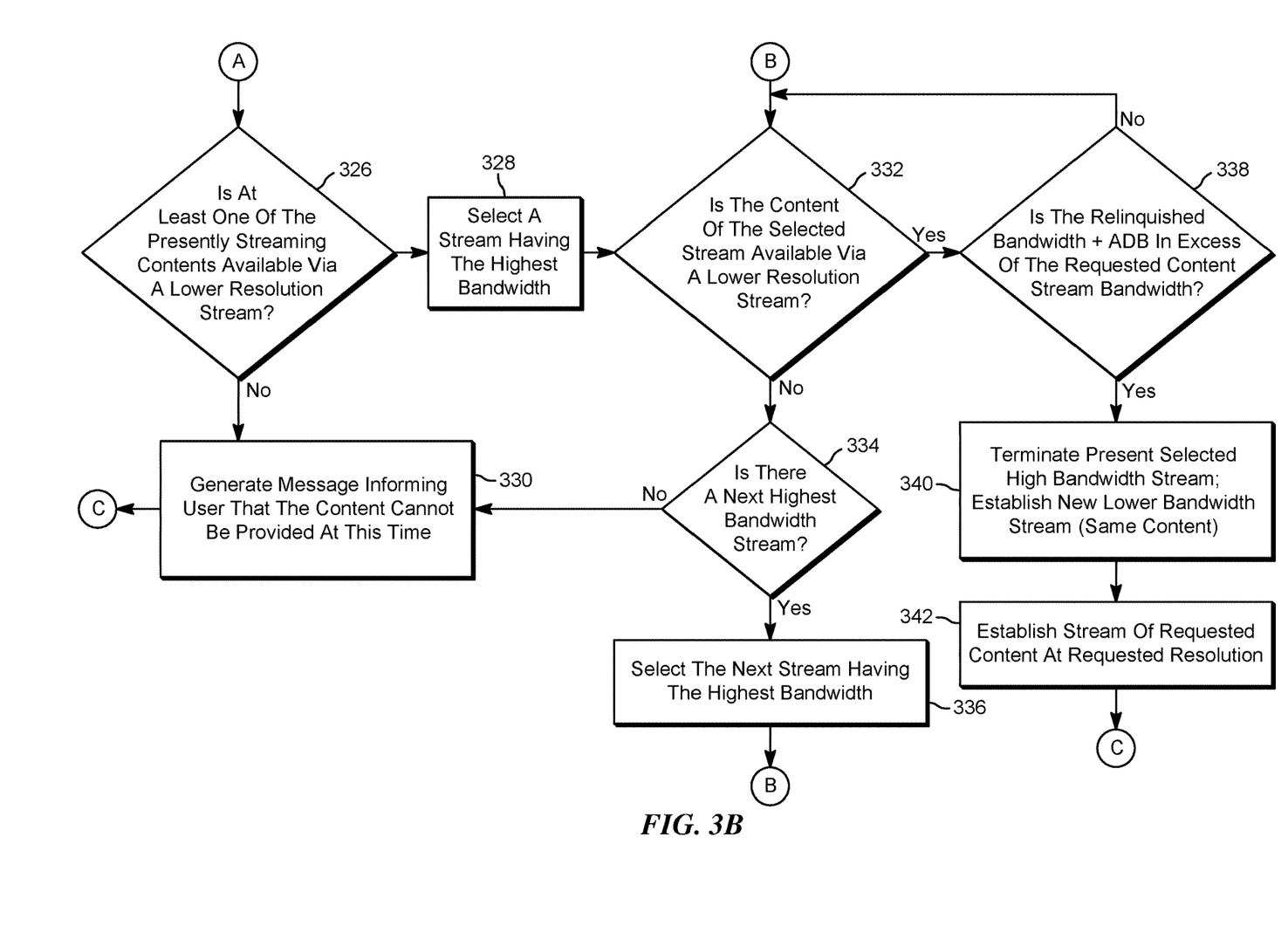

FIGS. 3A and 3B provide a process flow diagram of an alternate process supported by system 100. Assume that system 100 providing the same streaming content at the same bandwidth/resolution as described in the previous example, and that there is a ADB or 5 Mbps. Steps 302-324 are identical in scope and function to steps 202-224 (FIG. 2). However, in this alternate embodiment, when the requested content is not available via a lower resolution stream, the process continues with step 326 (FIG. 3B).

The playlist applicable to this example of the process flow of FIGS. 3A and 3B is shown in Table D:

TABLE D

| Content Title | Available Video Resolution | | | |
|---|---|---|---|---|
| | 4K | 1080p | 720p | SD |
| Epic Movie | • Chan A | | | |
| Soccer Match | • Chan B | • Chan C | • Chan D | |
| Cricket Match | | • Chan E | | |
| Cooking Program | | • Chan F | • Chan G | • Chan H |

In addition, client devices 108, 110 and 114 are streaming the same content at the same resolutions/bandwidth as shown in Table C. Consequently, the ADB of system 100 is 5 Mbps.

Assume a request is received by MGA 102 to stream a cricket match at a resolution of 1080p (requiring up to 12 M bps of bandwidth) to client device 112 for display upon DTV 124 (step 314). Processor 104 then makes a determination if fulfilling such a request would exceed the ADB (step 318). Since the cricket match is only available via a 1080p stream, there is a negative outcome to step 318 and the process continues with step 326 (FIG. 3B). In step 326, processor 104 references the information stored in memory 106 to determine if any of the presently streaming content is available via lower resolution streams. As shown in Table D, both the soccer match (presently being delivered via 4K stream) and the cooking program (presently being delivered via a 720p stream) are available via lower resolution streams. Consequently, the process continues with step 328. However, if none of the presently streaming content could be delivered via lower resolution/bandwidth streams, processor 1032 would generate a message informing the user that the content could not be provided as requested (step 330).

The selection made by processor 104 in step 328 can made on the basis of arbitrary predetermined criteria. This selection process may be a function of the present bandwidth of an active stream (select highest bandwidth stream, select lowest bandwidth stream, etc.), the time remaining in the particular streaming content (select stream for which the content is scheduled to terminate the soonest, etc.), or the type of content (never select a content stream associated with a live sporting event). In this particular example, processor 104 is programmed to select the active stream having the highest bandwidth. Both the epic movie stream and the soccer match are being delivered to client devices via 4K streams. Let us assume that processor 104 has been programmed to simply start at the top pf the stored listing of information when there are more than one streams are identified as having the highest bandwidth.

Processor 104 selects the epic movie stream in step 328. A determination is then made as to whether epic movie is available via a lower bandwidth stream. As shown in Table D, it is not, and step 332 results in a negative outcome. The process continues with step 334 wherein processor 104 queries the information stored in memory 106 to determine if there is another active stream that can be classified as having the next highest bandwidth. In accordance with the predetermined criteria programmed into processor 104, that next stream would be the one carrying the soccer match content. Processor 104 then selects that stream (step 336) and reverts to step 332.

Step 332 yields an affirmative outcome, as the soccer match (presently streaming in 4K) is also available as a 1080p and 720p stream, and the process continues with step 338. In step 338, processor 104 determines if the bandwidth relinquished if the next lower resolution stream (720p) for the soccer game were utilized, plus the bandwidth required to enable the requested cricket match is in excess of the calculated ADB. The query would be as follows: Is (present soccer stream bandwidth−next lower soccer stream bandwidth)+ADB greater than the bandwidth of the requested cricket content stream. In this case, the resultant equation would be (50−12)+5>12, which is true, so the process continues with step 340. Had step 338 resulted in a negative outcome, the process would have reverted to step 332 and new lower resolution stream for the soccer match content would have been sought.

In step 340 the present 4K stream of soccer content is terminated and a new 1080p stream of that content is established between MGA 102 and client device 110. Next, processor 104 establishes a stream to deliver the requested cricket match to client device 112 at the requested resolution of 1080p (step 342).

Figure 4:
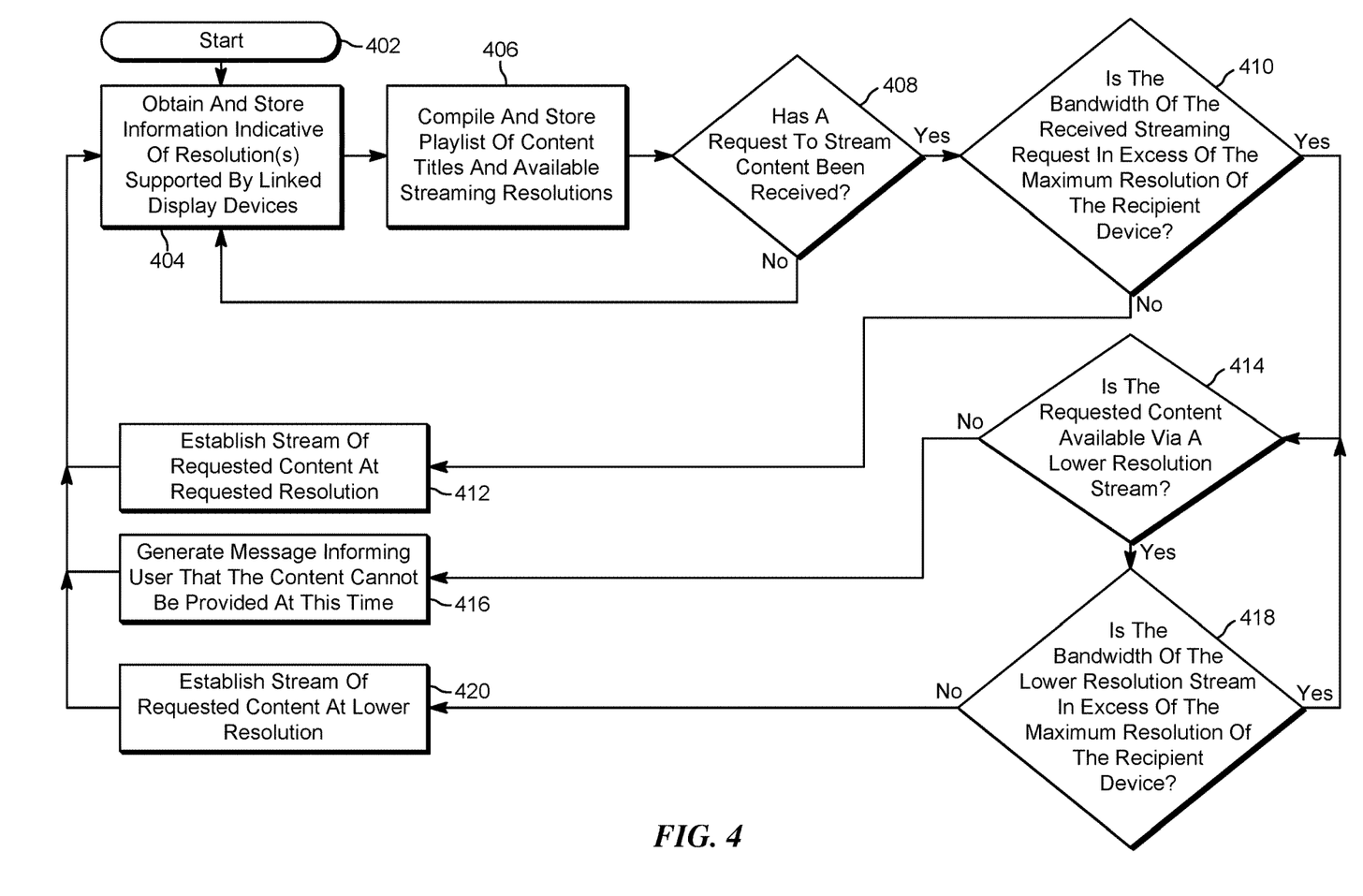
FIG. 4 is a flow diagram of a third process supported by the system of FIG. 1

Yet another alternate process supported by system 100 is depicted in the process flow diagram of FIG. 4. The process initiates with steps 402 and 404 wherein processor 104 is stores information indicative of the particular resolution(s) supported by each of the display devices is stored in memory 106. Table E provides a representation of this information for DTVs 120, 122 and 124, as well as tablet 126:

TABLE E

| Display Device | Maximum Supported Video Resolution | | | |
|---|---|---|---|---|
| | 4K | 1080p | 720p | SD |
| DTV 120 | • | | | |
| DTV 122 | | • | | |
| DTV 124 | | | • | |
| Tablet 126 | | | | • |

The process continues with step 406 processor 104 is compiles a resolution playlist of content available for streaming via MGA 102 (step 206). This playlist indicates the particular resolution or resolutions at which a particular streamed content is available from MSO headend 116. An example of one such playlist is shown in Table F:

TABLE F

| Content Title | Maximum Video Resolution | | | |
|---|---|---|---|---|
| | 4K | 1080p | 720p | SD |
| Epic Movie | • Chan A | | | |
| Soccer Match | • Chan B | • Chan C | • Chan D | |
| Cricket Match | | | • Chan E | • Chan F |
| Cooking Program | | | • Chan G | • Chan H |

The information required to compile the playlist is obtained from MSO headend 116 via broadband network 118. Processor 104 stores information indicative of the playlist in memory 106.

Processor 104 then determines if a request for streaming content has been received from one of the client devices (108-112) (see step 408). If not, the process reverts to step 404. However, if such a request was received, processor 104 determines if the bandwidth/resolution of the streaming request exceeds the maximum display resolution of the display device associated with the requesting client (step 410). The process continues with step 412 and the requested stream is established between MGA 102 and the requesting client device. For example, if a request for an SD stream of the cooking program was received from client device 114 intended for display upon tablet 126, the request would be fulfilled.

However, if the request from client device 114 was for a 720p display of the cooking show, processor 104 would reference information stored in memory 106 and make the determination that the requested resolution exceeded the maximum resolution capability of tablet 126. Step 410 would have an affirmative result and process would continue with step 414 in which processor 104 would again query memory 106 to determine if the requested content (the cooking program) was available at lower resolution. If not, processor would generate message informing the requesting user that the content cannot be provided at this time (step 416).

However, as is the case for the cooking show, the content was available at lower resolution, processor 104 would determine if the lower resolution stream was in excess of the maximum resolution of the display device (tablet 126) (see step 418). If the lower resolution stream was not in excess of the capabilities of tablet 126, processor 104 would establish a stream at that lower resolution to client device 114/tablet 126 (step 420). If step 418 yielded an affirmative outcome, the process would revert to step 414 and an even lower resolution stream for the content would be sought.

Although the invention herein has been described with reference to particular embodiments, it is to be understood that these embodiments are merely illustrative of the principles and applications of the present invention. For example, any of the links or connections described or shown as wired connections could be accomplished via wireless means (Wi-Fi, cellular networks, Bluetooth, ZigBee, etc.). Also, the various processes described could be combined with one another to offer a feature rich environment. It will also be understood that all or part of the above-described processing and storage associated with MGA 102 could be performed in whole or in-part by an offsite server or processing means located either at the MSO headend (138) or otherwise connected to requesting MGA. All of the above variations and reasonable extensions therefrom could be implemented and practiced without departing from the spirit and scope of the present invention as defined by the appended claims.

The invention claimed is:

1. A system for adaptive streaming management, comprising:
   at least one media gateway appliance configured to receive streaming content from a broadband network;
   at least one memory configured to store a resolution playlist of content available for streaming via the media gateway appliance, wherein said resolution playlist indicates a particular resolution or resolutions at which each particular streamed content is available;
   a plurality of client devices receiving streaming content from the media gateway appliance; and
   at least one processor configured to:
      determine the maximum streaming rate at which the at least one gateway appliance can receive streaming broadband content from the broadband network;
      dynamically determine the streaming rate at which streaming content is being delivered to each of the client devices from the media gateway appliance;
      compute the rate of additional streaming that the broadband network can support based upon at least the determined maximum streaming rate at which the at least one gateway appliance can receive broadband content and an aggregate streaming rate of the streaming content provided to the plurality of client devices;
      receive a request from an additional client device to stream desired content at a particular streaming rate, which is unavailable via a lower resolution stream;
      determine that the particular streaming rate exceeds the computed rate of additional streaming that the broadband network can support,
      identify a particular streamed content from the streaming content received by the plurality of client devices that is available via lower resolution streams by querying the resolution playlist, stored in the at least one memory; and
      terminate the stream of the identified particular streamed content and establish a new stream of the identified particular streamed content at the available lower resolution.

2. The system of claim 1 wherein at least one of the plurality of client devices comprises at least one of the following:
   a set-top box; and
   a broadband modem.

3. The system of claim 1 further comprising a plurality of displays, each associated with a particular client device and adapted to display the streaming content received by the associated client device.

4. The system of claim 3 wherein at least one of the plurality of displays comprises at least one of the following:
   a digital television;
   a computer monitor;
   a smartphone;
   a tablet; and
   a digital assistant.

5. The system of claim 1 wherein the resolution playlist further comprises information indicative of at least one of the following:
   content title;
   content type;
   content genre;
   content duration; and
   the elapsed time that a content stream has been streaming to a client device.

6. The system of claim 5 wherein at least one of the available streaming rates corresponds to at least one of the following video resolutions:
   4K;
   ultrahigh definition;
   high definition; and
   standard definition.

7. A system for adaptive streaming management, comprising:
   at least one media gateway appliance adapted to receive streaming content from a broadband network;
   at least one memory configured to store a resolution playlist of content available for streaming via the media gateway appliance, wherein said resolution playlist indicates a particular resolution or resolutions at which each particular streamed content is available;

a plurality of client devices receiving streaming content from the media gateway appliance; and at least one processor configured to:

determine the maximum streaming rate at which the at least one gateway appliance can receive streaming broadband content from the broadband network;

determine the streaming rate at which streaming content is being delivered to each of the client devices from the media gateway appliance;

compute the rate of additional streaming that the broadband network can support based, at least in part, upon the determination of the maximum streaming rate at which the at least one gateway appliance can receive broadband content and an aggregate streaming rate of the streaming content provided to the plurality of client devices; and terminate a stream of particular streamed content delivered to at least one of the plurality of client devices by the at least one media gateway appliance and establish a new stream of the particular streamed content at an available lower resolution based on at least the computed rate of additional streaming that the broadband network can support, the at least one resolution playlist, and a request to deliver streaming content to an additional client device.

8. The system of claim 7 wherein at least one of the plurality of client devices comprises at least one of the following:

a set-top box; and a broadband modem.

9. The system of claim 7 further comprising a plurality of displays, each associated with a particular client device and adapted to display the streaming content received by the associated client device.

10. The system of claim 9 wherein at least one of the plurality of displays comprises at least one of the following:

a digital television;

a computer monitor;

a smartphone;

a tablet; and a digital assistant.

11. The system of claim 7 wherein the resolution playlist further comprises information indicative of at least one of the following:

content title;

content type;

content genre;

content duration; and the elapsed time that a content stream has been streaming to a client device.

12. The system of claim 11 wherein at least one of the available streaming rates corresponds to at least one of the following video resolutions:

4K;

ultrahigh definition;

high definition; and standard definition.

13. A method for adaptive streaming management, in a system comprising:

at least one media gateway appliance configured to receive streaming content from a broadband network;

at least one memory configured to store a resolution playlist of content available for streaming via the media gateway appliance, wherein said resolution playlist indicates a particular resolution or resolutions at which each particular streamed content is available; and a plurality of client devices receiving streaming content from the media gateway appliance;

the method comprising the steps of:

determining the maximum streaming rate at which the at least one gateway appliance can receive streaming broadband content from the broadband network;

determining the streaming rate at which streaming content is being delivered to each of the client devices from the media gateway appliance;

computing the rate of additional streaming that the broadband network can support based upon at least the determined maximum streaming rate at which the at least one gateway appliance can receive broadband content and an aggregate streaming rate of the streaming content provided to the plurality of client devices;

receiving a request from an additional client device to stream desired content at a particular streaming rate, which is unavailable via a lower resolution stream;

determining that the particular streaming rate exceeds the computed rate of additional streaming that the broadband network can support, identifying a particular streamed content from the streaming content received by the plurality of client devices that is available via lower resolution streams by querying the resolution playlist, stored in the at least one memory; and terminating the stream of the identified particular streamed content and establish a new stream of the identified particular streamed content at the available lower resolution.

14. The method of claim 13 wherein at least one of the plurality of client devices comprises at least one of the following:

a set-top box; and a broadband modem.

15. The method of claim 13 further wherein the system further comprises a plurality of displays, each associated with a particular client device and adapted to display the streaming content received by the associated client device.

16. The method of claim 15 wherein at least one of the plurality of displays comprises at least one of the following:

a digital television;

a computer monitor;

a smartphone;

a tablet; and a digital assistant.

17. The method of claim 13 wherein the resolution playlist further comprises information indicative of at least one of the following:

content title;

content type;

content genre;

content duration; and the elapsed time that a content stream has been streaming to a client device.

18. The method of claim 17 wherein at least one of the available streaming rates corresponds to at least one of the following video resolutions:

4K;

ultrahigh definition;

high definition; and standard definition.

19. A method for adaptive streaming management, in a system comprising:
- at least one media gateway appliance adapted to receive streaming content from a broadband network;
- at least one memory configured to store a resolution playlist of content available for streaming via the media gateway appliance, wherein said resolution playlist indicates a particular resolution or resolutions at which each particular streamed content is available;
- a plurality of client devices receiving streaming content from the media gateway appliance;
- the method comprising the steps of:
  - determining the maximum streaming rate at which the at least one gateway appliance can receive streaming broadband content from the broadband network;
  - determining the streaming rate at which streaming content is being delivered to each of the client devices from the media gateway appliance;
  - computing the rate of additional streaming that the broadband network can support based, at least in part, upon the determination of the maximum streaming rate at which the at least one gateway appliance can receive broadband content and an aggregate streaming rate of the streaming content provided to the plurality of client devices; and
  - terminating a stream of particular streamed content delivered to at least one of the plurality of client devices by the at least one media gateway appliance and establish a new stream of the particular streamed content at an available lower resolution based on at least the computed rate of additional streaming that the broadband network can support, the at least one resolution playlist, and a request to deliver streaming content to an additional client device.

20. The method of claim 19 wherein at least one of the plurality of client devices comprises at least one of the following:
- a set-top box; and
- a broadband modem.

21. The method of claim 19 further wherein the system further comprises a plurality of displays, each associated with a particular client device and adapted to display the streaming content received by the associated client device.

22. The method of claim 21 wherein at least one of the plurality of displays comprises at least one of the following:
- a digital television;
- a computer monitor;
- a smartphone;
- a tablet; and
- a digital assistant.

23. The method of claim 19 wherein the resolution playlist further comprises information indicative of at least one of the following:
- content title;
- content type;
- content genre;
- content duration; and
- the elapsed time that a content stream has been streaming to a client device.

24. The method of claim 23 wherein at least one of the available streaming rates corresponds to at least one of the following video resolutions:
- 4K;
- ultrahigh definition;
- high definition; and
- standard definition.

* * * * *